United States Patent Office

3,368,999
Patented Feb. 13, 1968

3,368,999
HIGH TEMPERATURE SIMULTANEOUS COPOLYMERIZATION AND ALKYLOLATION OF THERMOSETTING AMIDE INTERPOLYMERS
Kazys Sekmakas and Karolis Drunga, Chicago, Ill., assignors to De Soto, Inc., a corporation of Delaware
No Drawing. Filed Nov. 9, 1964, Ser. No. 409,981
13 Claims. (Cl. 260—72)

ABSTRACT OF THE DISCLOSURE

Organic solvent-soluble alkylolated amide-containing interpolymers are produced by a process in which the unsaturated amide, such as acrylamide, is copolymerized with other ethylenically unsaturated material in an organic solvent medium containing a $C_1$–$C_3$ alkanol at elevated temperatures, preferably at least about 275° F. in the presence of an agent providing formaldehyde with copolymerization and methylolation being carried out in a single stage reaction with pressure being used to maintain the liquid phase. In the presence of a small proportion of basic catalyst and without removal of volatile component, it is found that the rapid high temperature reaction carried out under pressure does not cause gelation despite the fact that the interpolymers so-produced exhibit a significant thermosetting effect when baked at temperatures of 275° F. and higher. In this way, the solvent medium used may contain a major weight proportion of aromatic hydrocarbon solvent and a minor weight proportion of $C_1$–$C_3$ alkanol.

The present invention relates to the production of non-gelled, organic solvent-soluble, alkylolated amide-containing interpolymers by procedures which permit the achievement of numerous economies as well as the production of interpolymers possessing superior characteristics.

In accordance with conventional practice for the production of interpolymers of the type noted, it has been viewed as essential to cause extensive etherification to take place in order that these interpolymers which are thermosetting per se resist gelation upon storage. In this respect reference is made to Christenson Patent 3,037,963. In order to conduct the reaction, the prior art suggests the use of a plurality of processing steps and the removal of water in order to drive the etherification reaction forward to produce the extensive etherification which was desired. To permit removal of water, the reaction is carried out under reflux which makes it necessary that the reaction be carried out at normal atmospheric pressure. In order that the reaction take place in a reasonable amount of time, this has meant the selection of higher boiling solvents such as butanol, butyl Cellosolve, or other higher boiling alcohol. While lower boiling alcohols were contemplated by the art, these were not practical because the lower refluxing temperature associated with such lower boiling solvent resulted in excessive reaction times which are undesirable.

The present development, in one of its important aspects, is an outgrowth of the unexpected finding that stable and highly reactive alkylolated amide-containing interpolymers can be provided by appropriate reaction in alkaline medium, even though the alkylol groups are not extensively etherified. This concept is disclosed in the prior copending applications of Kazys Sekmakas, Ser. Nos. 225,871 and 225,872, filed Sept. 24, 1962, now United States Patents 3,257,475 and 3,278,638.

Accordingly, and in accordance with the present invention, the utilization of low boiling solvents is rendered feasible through the utilization of elevated pressure and this, in turn, is facilitated by virtue of the fact that any water present, including water of reaction, is not removed during the reaction. The utilization of pressure is still further facilitated in accordance with the invention by carrying out the addition polymerization and alkylolation reaction simultaneously in a single stage, single stage operation being more fully described and claimed in the prior copending application Ser. No. 100,804, filed Apr. 5, 1961, by us jointly with Robert E. Ansel, now United States Patent 3,163,623.

In the prior production of interpolymers of the type under consideration, the art has employed large proportions of alcoholic solvent, this being needed because aromatic hydrocarbons are not themselves adequate solvents for the amide, the aldehyde or the resulting interpolymers, and also because the higher boiling alcoholic solvents are relatively poor solvents requiring the utilization of a larger proportion thereof. In accordance with a feature of the invention, lower boiling alcohols, and especially isopropanol and ethanol are utilized in much smaller amount than was heretofore required of such solvents as butanol and butyl Cellosolve to provide important economies by virtue of the low cost and small proportion of these low boiling alcohols.

The alkylolated amide-containing interpolymers under consideration are thermosetting per se, a significant thermosetting effect being noted upon baking films of the interpolymers at temperatures of 275° F. and higher. The capacity for low temperature cure is enhanced when etherification is minimized by the use of an alkaline catalyst and also by the presence in the interpolymer of components which catalyze the cure, such as ethylenically unsaturated acids, or components which participate in the cure, such as ethylenically unsaturated alcohols, epoxides or polyesters. In accordance with the invention it has been found that the thermosetting addition polymers under consideration can be produced by reaction at temperatures of about 275° F. and higher, and without gelation, by proceeding in the presence of an alkaline catalyst and using elevated pressure without removal of water in order to maintain all of the components being reacted in the liquid phase and thereby prevent the condensation reactions which lead to gelation. This feature of the invention permits numerous advantages, especially from the standpoint of more rapid reaction, higher resin solids content in the polymerization system, the capacity to operate with sufficient speed to permit continuous processing (especially at temperatures of 325° F. and higher) and, most uniquely, the opportunity to provide interpolymers having a high cross-link density and which are free of mercaptan chain-terminating agent. In this regard, the mercaptans are moderately expensive and are viewed as detrimental with respect to the chemical inertness and aging characteristics of the product. Despite the obvious undesirability of mercaptan inclusion, all practical amide-containing interpolymers produced heretofore have included such an agent for, without it, it was not possible to produce interpolymers possessing a sufficient cross-link density as to permit the achievement of effective thermosetting characteristics.

As should be evident, a linear polymer of high molecular weight containing a large number of cross-linking sites cannot be cured properly because the product becomes too viscous before all of the cross-linking sites can be consumed by reaction and also before sufficient cross-links can be formed to render the cured film insensitive to solvent attack and elevated temperature. To prevent this, the mercaptan functions to lower the molecular weight of the polymer so that a high cross-link density can be achieved during cure. On the other hand, molecular weight can also be lowered by increasing reaction temperature and, per the invention, the use of higher temperatures previously viewed as impractical in the field of thermosetting acrylics are relied upon to replace mercaptan as the agency which controls chain length. Indeed, and at temperatures of about 300° F. and higher, the function of temperature in lowering molecular weight may become excessive and, per the invention, this is counteracted by increasing the solids content (ethylenic reactants and aldehyde) of the polymerization charge above 50% by weight to cause the approach to bulk reaction conditions to increase molecular weight.

More particularly and in accordance with preferred practice of the invention, the monomer components of the interpolymer are introduced into a pressure kettle containing a solvent system at an elevated reaction temperature, preferably at a temperature of 275° F. or higher, addition of the monomeric materials is incremental, and the solvent medium is constituted by a major proportion of aromatic hydrocarbon and a minor proportion of $C_1$–$C_3$ alcohols. The reaction is carried out far more rapidly than is conventional and the reaction vessel is maintained under pressure without removal of volatiles therefrom.

The invention is a solution copolymerization or interpolymerization of ethylenically unsaturated monomers including a proportion of monoethylenically unsaturated carboxylic acid amide.

The terms "copolymerization" and "interpolymerization" are used as synonyms herein. Solution copolymerization designates a reaction which takes place under the conditions which prevail in which the reactants and the products of reaction are in solution in an organic solvent. As previously indicated, the elevated temperatures which are preferred in accordance with the invention function to increase the solubility of the reactants and the products of reaction in the organic solvents which are selected and the lower alcohols which are preferably used in the invention have superior solubility characteristics in comparison with the higher boiling alcohols previously used.

While any monoethylenically unsaturated carboxylic acid amide may be used in accordance with the invention, acrylamide monomers such as acrylamide itself, methacrylamide and itaconate diamide are preferred. Amides of other unsaturated acids such as maleic acid diamide, fumaric acid diamide, sorbic acid amide and muconic acid diamide may less desirably be used.

Preferred interpolymers include significant proportions of monomers containing the $CH_2=C<$ group, especially combinations of monomers forming hard polymers, such as styrene, vinyl toluene and methyl methacrylate, with monomers forming soft polymers, such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate. Other diverse monomers such as vinyl chloride, vinyl stearate, n-butyl vinyl ether, lower olefins, acrylonitrile, etc., are also useful. Even materials devoid of the vinyl group such as maleic diesters, butene-2, conjugated fatty acids, etc., may be employed including unsaturated polyester resins, as disclosed in the prior copending application of Kazys Sekmakas, Ser. No. 115,330, filed June 7, 1961, now United States Patent 3,163,615.

As previously indicated, the presence of polymerizable materials which tend to lower the temperature of cure constitute a feature of the invention since, in such event, the capacity of utilizing the higher reaction temperatures is even more surprising.

From the standpoint of proportions, the achievement of a moderate or high cross-link density in the interpolymer requires the presence of at least approximately 5% by weight of acrylamide based on the total weight of unsaturated polymerizable material. While acrylamide or other amide may be used in an amount up to 50% on the same weight basis, preferred proportions encompass the use of from 10 to 30% by weight of the amide component.

With respect to interpolymer production, it is possible as disclosed in said prior application S.N. 100,804, filed Apr. 5, 1961, the disclosure of which is hereby incorporated by reference, to carry out the addition polymerization reaction at the same time that the aldehyde component is reacted with amido hydrogen atoms. In other words, polymerization and alkylolation may advantageously be accomplished at the same time and in a single stage. As previously indicated, the presence of a small proportion of basic catalyst is essential to the present invention, exactly as it was essential to the invention taught in said prior application.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free radical generating polymerization catalysts is too well known to require elucidation except to point out that typical catalysts are illustrated in the examples.

The aldehyde modifying agent in accordance with the invention may be any aldehyde but it is particularly preferred to employ formaldehyde in the form of a substance which yields an aldehyde under the conditions of the reaction such as paraformaldehyde, hexamethylene tetramine or trioxymethylene. As a feature of the invention, the use of pressure eliminates loss of aldehyde during reaction. The proportion of aldehyde can vary considerably, e.g., from 0.2–5 equivalents of aldehyde per amide group used in the formation of the interpolymer.

On the other hand, alcohol solutions of aldehyde can be used without regard for the small proportions of water which are introduced thereby into the reaction mixture. Indeed, the presence of water is a feature of the invention since water is a good solvent for aldehydes and it is excellently miscible with the lower alcohols which are also used in preferred practice. To the extent that the invention permits a larger proportion of water to be tolerated without harm, the economics of the resin system is improved.

While alkaline catalysis is used and volatile components are not removed during the reaction, some limited etherification of the aldehyde-modified amide interpolymer is inevitable when alcohols are present in the solvent medium. When some limited etherification takes place, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a hydrocarbon radical introduced by the aldehyde modifying agent and R$_1$ is the residue of the alcohol produced by the etherification reaction. When the etherifying alcohol is a glycol, the group R$_1$ is hydroxy terminated.

While it is desirable to employ basic catalysts in an amount of 0.1 to 1% based on the total weight of polymerizable material, and while any basic material may be used, amines and particularly tertiary amines being preferred, it is possible when using highest reaction temperatures with minimum conversion times to conduct the reaction so rapidly as to avoid gelation by virtue of the low molecular weight obtained and because condensation is a slow reaction which cannot proceed too far when no water is removed and when the reaction time is short. This is especially true at lower levels of amide content in the interpolymer, e.g., 2–8% by weight.

The presence of the amine catalyst promotes the alkylolation reaction while minimizing etherification and other similar reactions involving condensation. On the other hand, the proportion of added alkaline material need not be sufficient to create or maintain an alkaline pH for the reaction.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with other resinous materials, from a compatible organic solvent solution. These coatings may be pigmented or contain dyes, flow control agents, waxes and various other components as will be evident to those skilled in the art.

In the examples which follow, all parts are by weight, unless otherwise indicated.

EXAMPLE 1.—PREPARATION OF UNSATURATED POLYESTER RESIN

The unsaturated polyester resin is prepared by charging into a reactor equipped with an agitator, heating mantle, Dean-Stark trap, thermometer and nitrogen inlet tube, 790 grams of dehydrated castor oil fatty acids, 250 grams of crotonic acid, 785 grams of synthetic glycerine and 400 grams of isophthalic acid. 50 grams of xylol are added as reflux solvent. The mixture is then heated to 420° F. and maintained at this temperature until an acid value of 5.0 is reached. Then cool to 380° F. and add 240 grams of a technical grade of 1,1'-isopropylidenebis(p-phenyleneoxy)di-2-propanol, 160 grams of phthalic anhydride and 255 grams of azelaic acid. The temperature is again raised to 420° F. and held for an acid value of 13–15. 510 grams of n-butanol are then added to the product to provide a solution containing 80% solids.

The final characteristics of the polyester resin are:

Solids _____ percent__ 79.5
Viscosity (Gardner) _____ V–W
Color (Gardner) _____ 3–4

EXAMPLE 2.—PREPARATION OF METHYLOLATED ACRYLAMIDE INTERPOLYMER

*Procedure of polymerization*

|  | Grams |
|---|---|
| Aromatic hydrocarbon solvent (boiling range 145–195° C.) | 360 |
| n-Butanol | 111 |
| Paraformaldehyde | 100 |
| Acrylamide-monomer solution "A" | 130 |

Charge into autoclave equipped with a stirrer, temperature regulator and nitrogen inlet tube. Heat to 225–235° F., maintain nitrogen pressure of 18–20 p.s.i.g.

| Monomer solution "A": | Grams |
|---|---|
| Acrylamide | 104 |
| n-Butanol | 267 |
| 2-butoxyethanol | 260 |
| Triethylamine | 3.9 |
| Styrene | 221 |
| Methyl methacrylate | 73 |
| Ethyl acrylate | 637 |
| Unsaturated polyester resin of Example 1 | 325 |
| Di-tertiary-butyl peroxide | 7.8 |
| Azobisbutyronitrile | 7.8 |
| Benzoyl peroxide | 2.6 |
| Tertiary dodecyl mercaptan | 5.2 |

In a separate container, dissolve and add to autoclave under pressure of 30–40 p.s.i.g. at 250–260° F. over 1 hour.

| Catalyst solution "B": | Grams |
|---|---|
| Cumene-hydroperoxide | 8 |
| Aromatic hydrocarbon solvent (boiling range of 145–195° C.) | 30 |
| 2-butoxyethanol | 22 |

When monomer addition is complete, add 20 grams of catalyst solution "B" after 1, 2 and 3 hours while maintaining pressure of 40–45 p.s.i.g.

Hold for an additional 4 hours after monomer addition is completed. The total processing time (polymerization and condensation reactions) is 8 hours.

The final characteristics of the interpolymer resin are:

Solids _____ percent__ 54.3
Viscosity (Gardner) _____ X
Color (Gardner) _____ 1–2

EXAMPLE 3.—PREPARATION OF METHYLOLATED ACRYLAMIDE INTERPOLYMER

[THIS INTERPOLYMER IS PREPARED IN THE ABSENCE OF MONOHYDRIC ALCOHOL]

|  | Grams |
|---|---|
| Methyl ethyl ketone | 1250 |
| Triethylamine | 3.8 |
| Acrylamide | 163 |
| Styrene | 750 |
| Glacial methacrylic acid | 8.8 |
| Ethyl acrylate | 329 |
| Azobisbutyronitrile | 7.5 |
| Di-tertiary-butyl peroxide | 7.5 |
| Benzoyl peroxide | 2.5 |
| Tertiary dodecyl mercaptan | 25 |

Charge into autoclave equipped with a stirrer, temperature regulator, and nitrogen inlet tube. After displacing air with nitrogen, heat the contents of autoclave to 250–260° F. and maintain nitrogen pressure at 50–55 p.s.i.g. Hold for 1½ hours at 260° F.

| Catalyst solution: | Grams |
|---|---|
| Cumene hydroperoxide | 22.5 |
| Methyl ethyl ketone | 15.0 |

Add in three portions after 1½, 2½ and 3½ hours. Hold for an additional 3 hours at 260° F.

Aqueous solution of formaldehyde (37%)__gms__ 285.0

Cool to 90° F. and add formaldehyde solution. Heat to 160–170° F. and hold for 3 hours while maintaining nitrogen pressure of 35–40 p.s.i.g. Cool to 80° F. and filter.

The final characteristics of the interpolymer are:

Solids _____ percent__ 46.4
Viscosity (Gardner) _____ B–C

EXAMPLE 4

*Procedure of polymerization*

|  | Grams |
|---|---|
| Aromatic hydrocarbon solvent (boiling range 145–195° C.) | 340 |
| n-Butanol | 112 |
| Paraformaldehyde | 84 |

Charge into autoclave equipped with a stirrer, temperature regulator and nitrogen inlet tube. Heat to 225–235° F., while maintaining nitrogen pressure of 18–20 p.s.i.g.

|  | Grams |
|---|---|
| Ethyl acrylate | 377 |
| Methyl methacrylate | 77 |
| Styrene | 325 |
| 2-ethyl hexyl acrylate | 130 |
| Acrylamide | 130 |
| n-Butanol | 266 |
| 2-butoxy ethanol | 280 |
| Triethylamine | 3.9 |
| Unsaturated polyester resin of Example 1 | 325 |
| Di-tertiary-butyl peroxide | 7.8 |
| Azobisbutyronitrile | 7.8 |
| Tertiary dodecyl mercaptan | 14 |

In a separate container, dissolve and add to autoclave under pressure of 30–40 p.s.i.g. at 250–260° F. over 1–1½ hours.

Catalyst solution: Grams
   Cumene hydroperoxide _____ 7.8
   Aromatic hydrocarbon solvent (boiling range
      145–195° C.) _____ 50.2

When monomer addition is complete, add 29 grams of catalyst solution after 1 and 2 hours while maintaining pressure at 40–45 p.s.i.g.

Hold for an additional 4 hours after monomer addition is completed. The total processing time, including polymerization and condensation reactions, is 7 hours.

The final characteristics of the interpolymer are:

Solids _____ percent__ 53.1
Viscosity (Gardner) _____ W+
Color (Gardner) _____ 2

*Evaluation of interpolymer in gloss coatings*

The interpolymer of Example 2 is formulated into a gloss enamel consisting of 32% non-volatile resin of Example 2 and 28% titanium dioxide pigment. The enamel is applied on treated aluminum panels using a #38 wire wound rod baked at a temperature of 475° F. for 90 seconds in a gas fired oven.

The cured coating has the following properties:

Gloss (60°) _____ 84.
Pencil hardness _____ HB.
Reverse impact _____ Pass 45 inch lbs.
60 seconds' toluol resistance _____ Insoluble.[1]
Adhesion _____ Very good.
2T bend [2] _____ Good.
Chill bump test (46° F.) _____ Pass 40 inch/lbs.

[1] Solvent resistance is evaluated by using toluol rubs and counting the number of rubs which are required before bare metal shows through. The test is terminated after sixty rubs.
[2] The 2T bend test procedure is carried out as follows: The coated panels with the coating on the outside of the panel are bent 180° (U bend) by dies through a bend which has a radius equal to one metal thickness.

As the above results indicate, the coatings prepared utilizing the interpolymer of Example 2 have extremely good flexibility, impact and adhesion properties, these being the full equivalent of materials in commerce and which contain the same proportions of the same ingredients. On the other hand, the processing time was greatly reduced which provides a considerable economy. Also, the proportion of aromatic hydrocarbon is increased which reduces the cost of the solvent mixture. Also, no special cooling equipment is needed as is normally required in connection with batch operation at atmospheric pressure where extremely large amounts of heat are generated in a short period of time of time which requires extensive cooling capacity to control the exotherm.

Operation in accordance with the invention using lower boiling alcohols and more elevated temperatures in the absence of mercaptan chain terminating agent is illustrated in the following example.

EXAMPLE 5

*Procedure of preparation (parts by weight)*

| | Time | Temp.,°F. | Pressure | Visc. |
|---|---|---|---|---|
| Charge into reactor, heat to 300° F.: | | | | |
|   620 Aromatic hydrocarbon solvent (boiling range 145–195° C.) | | | | |
|   136 Aromatic hydrocarbon solvent (boiling range 375–410° F.) | | | | |
|   156 Isopropyl alcohol | 9:03–10:20 | 70–295 | 0–51 | |
|   68 Paraformaldehyde (91%—balance water) | | | | |
|   156 Monomer Premix | | | | |
| Premix and add over 20–30 minute period at 300° F.—Monomer Premix: | | | | |
|   125 Acrylamide | | | | |
|   350 Isopropyl alcohol | | | | |
|   764 Ethyl acrylate | | | | |
|   265 Styrene | 10:34 | 305 | 63 | |
|   87 Methyl methacrylate | | | | |
|   14 Glacial methacrylic acid | | | | |
|   390 Polyseter resin of Example 1 | | | | |
| Addition finished: | | | | |
|   5 Triethylamine | | | | |
|   8 Di-tertiary butyl peroxide | 10:45 | 297 | 150 | |
|   8 Azobisbutyronitrile | | | | |
|   2 Benzoyl proxide | | | | |
| 6 Cumene hydroperoxide | 11:47 | 299 | 120 | T |
| 40 Isopropyl alcohol | 12:17 | 299 | 118 | U+ |

The final characteristics of the interpolymer are:

Solids _____ 57.6%.
Viscosity (Gardner) _____ U+.
Color (Gardner) _____ 2.
Conversion time _____ 70 minutes.
Processing time _____ 3 hours, 14 minutes.

The further increase in reaction speed and the capacity of using lower boiling alcohols is well illustrated in the above Example 5. It will be noted that the very high proportion of resin solids (57.6%) created a viscosity on the Gardner scale of only U+ establishing that the molecular weight of the product is certainly not higher than is conventionally obtained in the presence of a mercaptan chain-terminating agent not present in the above example. The interpolymer product upon being cured produced excellent results which are the full equivalent of commercial materials prepared from the same components in the same proportions.

When using still more elevated temperatures, the reaction can be carried out even more rapidly so that, at reaction temperatures of about 325° F. and higher, the reaction is sufficiently rapid to permit continuous operation with the volume of the pressure kettle being replaced from 1 to approximately 5 times per hour. Preferably, and to minimize decomposition, the gas space in the reaction vessel is kept at a minimum, e.g., less than 25% of the reactor volume in order to minimize the opportunity for reaction involving the gas phase.

The rapid reactions which can be obtained and the low molecular weights which are achievable utilizing temperatures above 325° F. are illustrated in the following example.

EXAMPLE 6

*Procedure of polymerization*

| | Grams |
|---|---|
| Xylol | 450 |
| Butanol | 350 |
| Paraformaldehyde | 100 |

Charge into autoclave equipped with a stirrer, temperature regulator and nitrogen inlet tube. Heat to 325° F. while maintaining nitrogen pressure of 47–150 p.s.i.g.

| | Grams |
|---|---|
| Acrylamide | 179 |
| Styrene | 633 |
| Ethyl acrylate | 539 |
| Glacial methacrylic acid | 12 |
| Butanol | 340 |
| 2-butoxy ethanol | 100 |
| Triethylamine | 5 |
| Azobisbutyronitrile | 5 |
| Di-tertiary-butyl peroxide | 5 |

Premix and pump into autoclave at a uniform rate over a period of 30 minutes. The temperature increases to 365° F. during addition.

Xylol _____gms__ 15

Used to flush the inlet line. Drop temperature to 270–280° F. using water cooling if needed.

| | Grams |
|---|---|
| Di-tertiary-butyl peroxide | 15 |
| Xylol | 60 |
| Butanol | 50 |

When addition is completed, add ¼ part of this mixture every 15 minutes.

Xylol _____gms__ 15

Flush inlet line again after above mixture is added and hold for an additional 1 hr. and 20 minutes. Cool to 80° F. and filter.

The final characteristics of the interpolymer are:

| | |
|---|---|
| Solids _____percent__ | 51.9 |
| Viscosity (Gardner) | N |
| Color (Gardner) | 1–2 |

Despite the low viscosity of the product, it was capable or rapid cure to provide coatings of excellent quality.

The course of the reaction used in Example 6 may be observed from the following time chart.

| Time | Temp., °F. | Viscosity | Color | P.s.i.g. | Cooking Log |
|---|---|---|---|---|---|
| 0 | | | | 0 | Heat on. |
| 55 mins | 322 | | | 47 | Addition started. |
| 1 hr. 25 mins | 365 | | | 150 | Addition completed, line flushed. |
| 1 hr. 40 mins | 290 | D+ | 0–1 | 85 | Sample taken, ¼ o catalyst added. |
| 1 hr. 55 mins | 278 | | | 81 | ¼ of catalyst added. |
| 2 hrs. 10 mins | 278 | | | 79 | Do. |
| 2 hrs. 25 mins | 275 | | | 80 | Remainder of catalyst added, line flushed. |
| 2 hrs. 30 mins | 275 | F | 0–1 | 82 | Sample taken. |
| 2 hrs. 45 mins | 277 | G–H | 0–1 | 80 | Do. |
| 3 hrs | | I–J | 1 | 78 | Do. |
| 3 hrs. 15 mins | 278 | N | 1–2 | 79 | Heat off, cooled, and filtered. |

The invention is defined in the claims which follow. We claim:

1. In the production of non-gelled, organic solvent-soluble, alkylolated amide-containing thermosetting interpolymers in which monoethylenically unsaturated carboxylic acid amide is copolymerized with ethylenically unsaturated material copolymerizable therewith in a solution copolymerization reaction in organic solvent and in the presence of aldehyde so that copolymerization and methylolation are effected together in a single stage reaction, the improvement which comprises selecting, as part of said organic solvent, a $C_1$–$C_3$ alkanol, and carrying out the copolymerization reaction at an elevated reaction temperature of at least about 275° F. promoting rapid copolymerization, gelation of said thermosetting interpolymer being avoided by the maintenance of elevated pressure without removal of volatile component to maintain the liquid phase and by the presence of at least 0.1% by weight of basic catalyst.

2. The improvement of claim 1 in which said copolymerization is carried out in the absence of any mercaptan chain-terminating agent and said monoethylenically unsaturated carboxylic acid amide is present in an amount of at least 5% by weight, based on the weight of total polymerizable material.

3. In the production of non-gelled, organic solvent-soluble, alkylolated amide-containing thermosetting interpolymers in which monethylenically unsaturated carboxylic acid amide is copolymerized with ethylenically unsaturated material copolymerizable therewith in a solution copolymerization reaction in organic solvent and in the presence of an agent providing formaldehyde so that copolymerization and methylolation are effected together in a single stage reaction, the improvement which comprises copolymerizing from 10–30% by weight of an acrylamide, based on the total weight of ethylenically unsaturated material, in an organic solvent comprising a major proportion of aromatic hydrocarbon solvent and a minor proportion of $C_1$–$C_3$ alkanol, and carrying out the copolymerization reaction at an elevated reaction temperature of at least about 275° F. promoting rapid copolymerization, gelation of said thermosetting interpolymer being avoided by the maintenance of elevated pressure without removal of volatile component to maintain the liquid phase and by the presence of at least 0.1% by weight of basic catalyst.

4. The improvement of claim 3 in which the process is conducted continuously at a temperature of at least about 325° F.

5. The improvement of claim 3 in which said copolymerization is carried out in the absence of any mercaptan chain-terminating agent at a temperature of at least about 325° F. and with the solids content of the solution being above 50% by weight to cause the approach to bulk reaction conditions to increase molecular weight.

6. The improvement of claim 3 in which the ethylenically unsaturated material copolymerizable with said amide includes a proportion of monoethylenically unsaturated carboxylic acid.

7. The improvement of claim 3 in which the ethylenically unsaturated material copolymerizable with said amide includes a component selected from the group consisting of ethylenically unsaturated alcohols, epoxides and polyesters which is reactive with the methylol group so as to increase the tendency toward gelation.

8. In the production of non-gelled, organic solvent-soluble, alkylolated amide-containing thermosetting interpolymers in which monoethylenically unsaturated carboxylic acid amide is copolymerized with ethylenically unsaturated material copolymerizable therewith in a solution copolymerization reaction in organic solvent and in the presence of an agent providing formaldehyde so that copolymerization and methylolation are effected together in a single stage reaction, the improvement which comprises copolymerizing from 10–30% by weight of an acrylamide, based on the total weight of ethylenically unsaturated material, in an organic solvent, and carrying out the copolymerization reaction at an elevated reaction temperature of at least about 275° F. promoting rapid copolymerization, gelation of said thermosetting interpolymer being avoided by the maintenance of elevated pressure without removal of volatile component to maintain the liquid phase and by the presence of at least 0.1% by weight of basic catalyst.

9. In the production of non-gelled, organic solvent-soluble, alkylolated amide-containing thermosetting interpolymers in which monoethylenically unsaturated carboxylic acid amide is copolymerized with ethylenically unsaturated material copolymerizable therewith in a solution copolymerization reaction in organic solvent and in the presence of an agent providing formaldehyde so that copolymerization and methylolation are effected together in a single stage reaction, the improvement which comprises copolymerizing at least 2% by weight of an acrylamide, based on the total weight of ethylenically unsaturated material, in an organic solvent, and carrying out the copolymerization reaction at an elevated reaction temperature of at least about 325° F. promoting rapid copolymerization, gelation of said thermosetting interpolymer being avoided by the maintenance of elevated pressure without removal of volatile component to maintain the liquid phase and by the rapidity of the reaction.

10. The improvement of claim 9 in which the proportion of said acrylamide is from 2–8% by weight.

11. The improvement of claim 9 in which at least 0.1% by weight of basic catalyst is present to further insure against gelation.

12. In the production of non-gelled, organic solvent-soluble, alkylolated amide-containing thermosetting interpolymers in which monoethylenically unsaturated carboxylic acid amide is copolymerized with ethylenically unsaturated material copolymerizable therewith in a solution copolymerization reaction in organic solvent, and in the presence of formaldehyde so that copolymerization and methylolation are effected in a single stage reaction, the improvement which comprises selecting, as said organic solvent, a mixture of a major weight proportion of aromatic hydrocarbon solvent and a minor weight proportion of $C_1$–$C_3$ alkanol, and carrying out the copolymerization reaction at an elevated reaction temperature above the boiling point of said alkanol promoting rapid copolymerization, gelation of said thermosetting interpolymer being avoided by the maintenance of elevated pressure without removal of volatile component to maintain the liquid phase and by the presence of at least 0.1% by weight of basic catalyst, said reaction being carried out in the substantial absence of mercaptan chain-terminating agent.

13. A method as recited in claim 12 in which said solution copolymerization reaction is carried out at a solids content above 50% by weight.

References Cited

UNITED STATES PATENTS

| | | | |
|---|---|---|---|
| 3,163,623 | 12/1964 | Sekmakas et al. | 260—72 |
| 3,222,321 | 12/1965 | Sekmakas | 260—72 |

FOREIGN PATENTS 478,889  11/1951  Canada.

WILLIAM H. SHORT, *Primary Examiner.*

E. M. WOODBERRY, *Assistant Examiner.*